United States Patent
Doi

(10) Patent No.: US 9,178,630 B2
(45) Date of Patent: Nov. 3, 2015

(54) RECEIVING CIRCUIT AND COMMUNICATION CIRCUIT

(71) Applicant: FUJITSU LIMITED, Kawasaki-shi, Kanagawa (JP)

(72) Inventor: Yoshiyasu Doi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/109,380

(22) Filed: Dec. 17, 2013

(65) Prior Publication Data
US 2014/0286378 A1    Sep. 25, 2014

(30) Foreign Application Priority Data
Mar. 25, 2013 (JP) ................................. 2013-062723

(51) Int. Cl.
*H04B 17/20* (2015.01)
*H04B 7/08* (2006.01)

(52) U.S. Cl.
CPC ............... *H04B 17/20* (2015.01); *H04B 7/086* (2013.01)

(58) Field of Classification Search
CPC ........ H04B 17/20; H04B 17/10; H04B 17/21; H04B 1/38; H04B 7/086
See application file for complete search history.

(56) References Cited

U.S. PATENT DOCUMENTS

| | | | | |
|---|---|---|---|---|
| 4,475,220 | A * | 10/1984 | Mattei et al. ................... | 375/332 |
| 4,779,505 | A * | 10/1988 | Suzuki ............... | 84/622 |
| 5,073,904 | A * | 12/1991 | Nakamura et al. ............. | 375/340 |
| 5,549,111 | A * | 8/1996 | Wright et al. ................. | 600/443 |
| 6,347,233 | B1 * | 2/2002 | Solar et al. ................... | 455/553.1 |
| 2002/0181788 | A1* | 12/2002 | Kosugi et al. ................. | 382/233 |
| 2003/0028820 | A1* | 2/2003 | Takashi et al. .................... | 714/5 |
| 2004/0101068 | A1* | 5/2004 | Wang et al. ................... | 375/324 |
| 2007/0035867 | A1* | 2/2007 | Higashino ....................... | 360/51 |
| 2007/0160173 | A1 | 7/2007 | Takeuchi | |
| 2007/0211824 | A1* | 9/2007 | Yamazaki ..................... | 375/302 |

FOREIGN PATENT DOCUMENTS

JP   2007-184847 A   7/2007

* cited by examiner

*Primary Examiner* — Chieh M Fan
*Assistant Examiner* — Sarah Hassan
(74) *Attorney, Agent, or Firm* — Arent Fox LLP

(57) ABSTRACT

A receiving circuit includes: an interpolation circuit that generates, by using an interpolation coefficient, output data including a data point and a boundary point from pieces of input data that are input in chronological order; a detection circuit that outputs a detection signal when the detection circuit detects a phase of the output data by using the boundary point of the output data; a low pass filter that filters the detection signal and generates the interpolation coefficient; and a modulation circuit that modulates, by using a modulation signal having a frequency different from a cutoff frequency of the low pass filter, the interpolation coefficient generated by the low pass filter, and outputs the modulated interpolation coefficient to the interpolation circuit.

7 Claims, 17 Drawing Sheets

RECEIVING CIRCUIT AND COMMUNICATION CIRCUIT

CROSS-REFERENCE TO RELATED APPLICATION

This application is based upon and claims the benefit of priority of the prior Japanese Patent Application No. 2013-062723, filed on Mar. 25, 2013, the entire contents of which are incorporated herein by reference.

FIELD

The embodiments discussed herein are related to a receiving circuit and a communication circuit, where, for example, the receiving circuit may generate, via an interpolation coefficient, output data from pieces of data input in chronological order.

BACKGROUND

With increase in performance of information processing apparatuses, such as a device and a server that are intended for a communication backbone, the data rate at which a signal is transmitted to and received from the respective apparatuses is increasing. The receiving circuit of such transmitting/receiving apparatuses may be a synchronous-type receiving circuit in which sampling is performed in synchronization with a phase of input data or an asynchronous-type receiving circuit in which sampling is performed without synchronizing with a phase of input data. In an asynchronous receiving circuit, interpolation is performed on sampled data by using an interpolation code, thereby generating reception data (see, for example, Japanese Laid-open Patent Publication No. 2007-184847).

A stress test may sometimes be performed on an asynchronous receiving circuit. For example, a test of an operational margin is sometimes performed by reducing the size of an eye pattern (that is, by using a stressed eye). The test of an operational margin using a stressed eye is performed when operations of a transmitting circuit and a receiving circuit are not in synchronization with each other. If the operations of the transmitting circuit and the receiving circuit are in synchronization with each other, the stress test may be performed by controlling an interpolation code (hereinafter, this may be referred to as an interpolation coefficient). When the operations of the transmitting circuit and the receiving circuit are not in synchronization with each other, the stress test may be performed with an interpolation function enabled. As a method for performing the stress test when the operations are not in synchronization with each other, a method has been considered in which points in time at which a data point and a boundary point are sampled are individually controlled. However, this method may make circuitry more complicated or may not be able to provide a correct amplitude.

SUMMARY

According to an aspect of the embodiment, a receiving circuit includes: an interpolation circuit that generates, by using an interpolation coefficient, output data including a data point and a boundary point from pieces of input data that are input in chronological order; a detection circuit that outputs a detection signal when the detection circuit detects a phase of the output data by using the boundary point of the output data; a low pass filter that filters the detection signal and generates the interpolation coefficient; and a modulation circuit that modulates, by using a modulation signal having a frequency different from a cutoff frequency of the low pass filter, the interpolation coefficient generated by the low pass filter, and outputs the modulated interpolation coefficient to the interpolation circuit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments will be described below with reference to the drawings.

Figure 1:
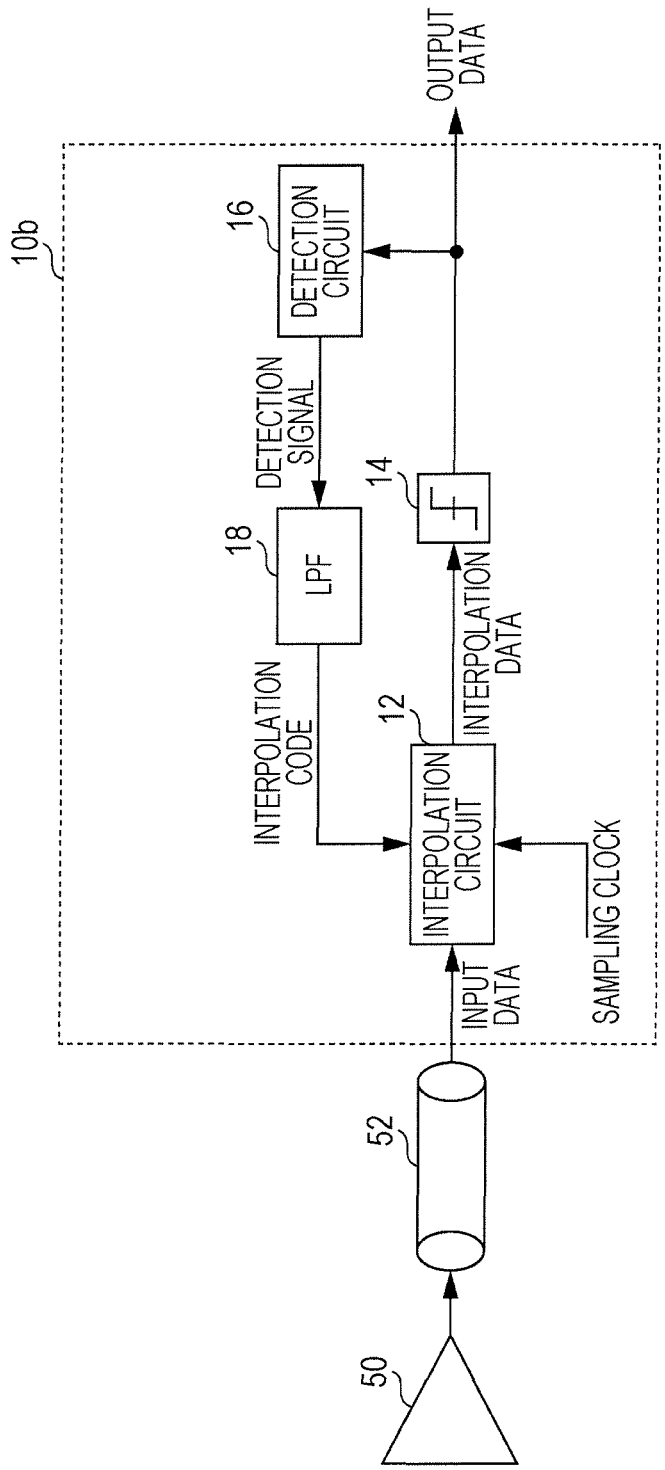
FIG. 1 is a block diagram of a system including a receiving circuit.

First, an asynchronous receiving circuit will be described. FIG. 1 is a block diagram of a system including a receiving circuit. Referring to FIG. 1, the system may include a transmitting circuit 50, a transmission path 52, and a receiving circuit 10b. The transmitting circuit 50 may transmit a light signal. The light signal may be transmitted through the transmission path 52. The transmission path 52 may be an optical fiber, for example. The received light signal may be converted into an electrical signal by a photoelectric converter. The receiving circuit 10b may generate a digital signal from the input electrical signal.

The receiving circuit 10b may include an interpolation circuit 12, a decision circuit 14, a detection circuit 16, and a low pass filter (LPF) 18. The interpolation circuit 12 may generate, by using an interpolation code and a sampling clock, interpolation data that may include a data point and a boundary point from pieces of input data that are input in chronological order. The decision circuit 14 may compare the interpolation data with a reference value and thereby determine whether the interpolation data is at a high level or a low level. Thus, the decision circuit 14 may generate output data. When the detection circuit 16 detects a phase of the output data by using a boundary point of the output data, the detection circuit 16 may output a detection signal. The LPF 18 may filter the detection signal and set the filtered signal as the interpolation code. For example, the LPF 18 may pass a signal having a frequency less than or equal to a cutoff frequency and not pass a signal having a frequency higher than or equal to the cutoff frequency. A clock data recovery (CDR) circuit may be used as the receiving circuit 10$b$.

Figure 2:
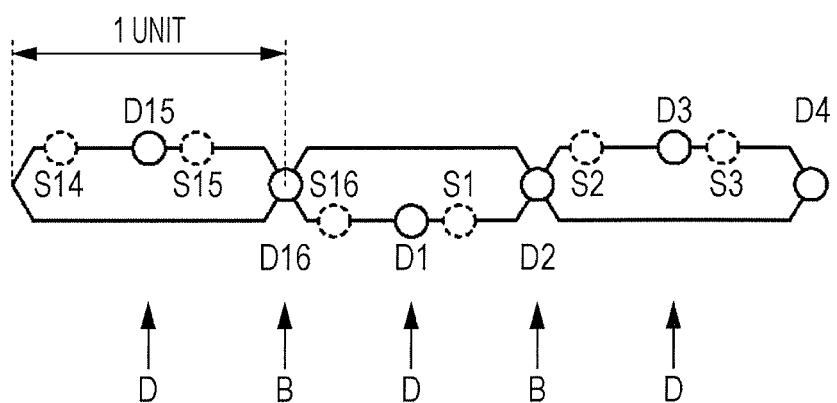
FIG. 2 illustrates signals with respect to time.

FIG. 2 illustrates signals with respect to time. In the following embodiments, as an example, a 2x scheme in which two pieces of data are sampled in one unit interval will be described; however, the embodiments may be applied to another scheme. Referring to FIG. 2, $S_n$'s correspond to pieces of input data that have been input in chronological order. The interpolation circuit 12 may generate one piece of interpolation data $D_n$ from two pieces of input data $S_{n-1}$ and $S_n$ (n is a natural number). When an interpolation code k is defined by 0≤k≤1, the interpolation data $D_n$ may be generated by $D_n=(1-k)\times S_{n-1}+k\times S_n$. Thus, interpolation data whose phase matches a phase of input data may be generated. In this way, the interpolation code k may be a coefficient that assigns weight to input data. In the 2x scheme, as indicated by vertical arrows, a data point D and a boundary point B may be alternately generated. The data point may be a point which is treated as digital data in a circuit subsequent to the receiving circuit, and the boundary point may be a point at which a transition of data is made. In the 2x scheme, for example, the data point may be a midpoint between boundary points.

Figure 3:
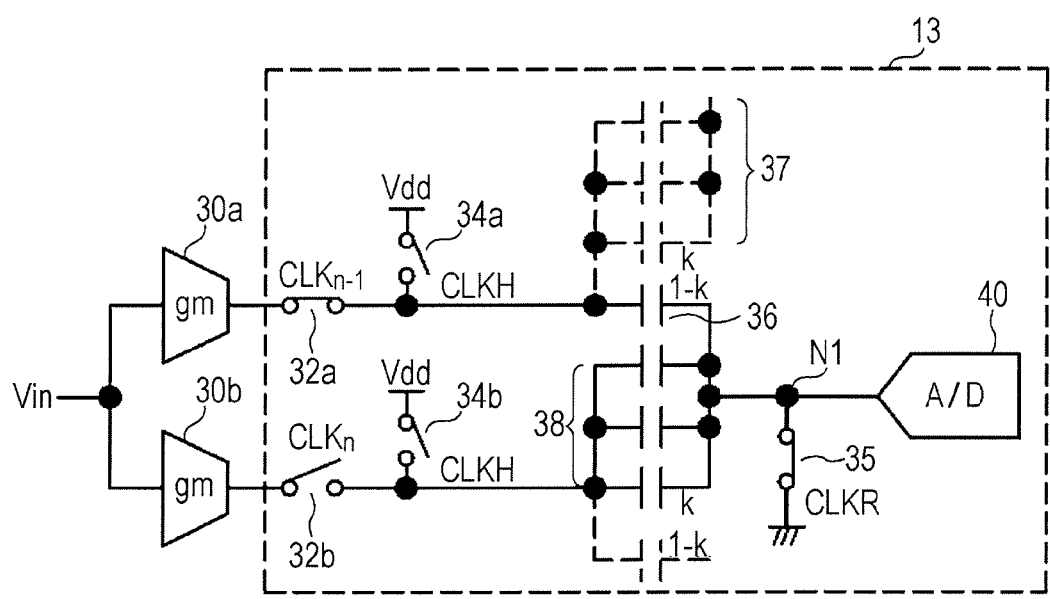
FIG. 3 is a circuit diagram illustrating part of an interpolation circuit.

Next, an example of an interpolation circuit of the asynchronous receiving circuit will be described. FIG. 3 is a circuit diagram that illustrates a part of the interpolation circuit and illustrates a circuit that generates one piece of interpolation data from two pieces of input data that are adjacent to each other in chronological order. Referring to FIG. 3, part of the interpolation circuit 12 may include gm circuits 30$a$ and 30$b$, and a sampling circuit 13. The sampling circuit 13 may include switches 32$a$, 32$b$, 34$a$, 34$b$, and 35, variable capacitors 36 and 38, and an analog-to-digital converter (A/D) 40. A path may branch into two paths between an input voltage signal Vin and a node N1. In one path, the gm circuit 30$a$, the switch 32$a$, and the variable capacitor 36 are electrically connected in series. The voltage signal Vin may be input to the gm circuit 30$a$ and converted into a current. The switch 32$a$ may be electrically connected between an output terminal of the gm circuit 30$a$ and an end of the variable capacitor 36. The switch 34$a$ may be electrically connected between the end of the variable capacitor 36 and a power supply Vdd. The other end of the variable capacitor 36 may be connected to the node N1.

In the other path, the gm circuit 30$b$, the switch 32$b$, and the variable capacitor 38 may be electrically connected in series. The voltage signal Vin corresponding to input data may be input to the gm circuit 30$b$ and converted into a current. The switch 32$b$ may be electrically connected between an output terminal of the gm circuit 30$b$ and an end of the variable capacitor 38. The switch 34$b$ may be electrically connected between the end of the variable capacitor 38 and the power supply Vdd. The other end of the variable capacitor 38 may be connected to the node N1. The switch 35 may be electrically connected between the node N1 and the ground. The node N1 may be connected to the A/D 40. The switches 32$a$, 32$b$, 34$a$, 34$b$, and 35 may be respectively turned on when clocks $CLK_{n-1}$, $CLK_n$, CLKH, CLKH, and CLKR are at a high level, and these switches may be respectively turned off when these clocks are at a low level. The variable capacitor 36 may have a capacitance corresponding to 1−k, and a capacitor 37 having a capacitance corresponding to k may not contribute to the capacitance. The variable capacitor 38 may have a capacitance corresponding to k, and a capacitor 39 (not illustrated) having a capacitance corresponding to 1−k may not contribute to the capacitance.

Figure 4:
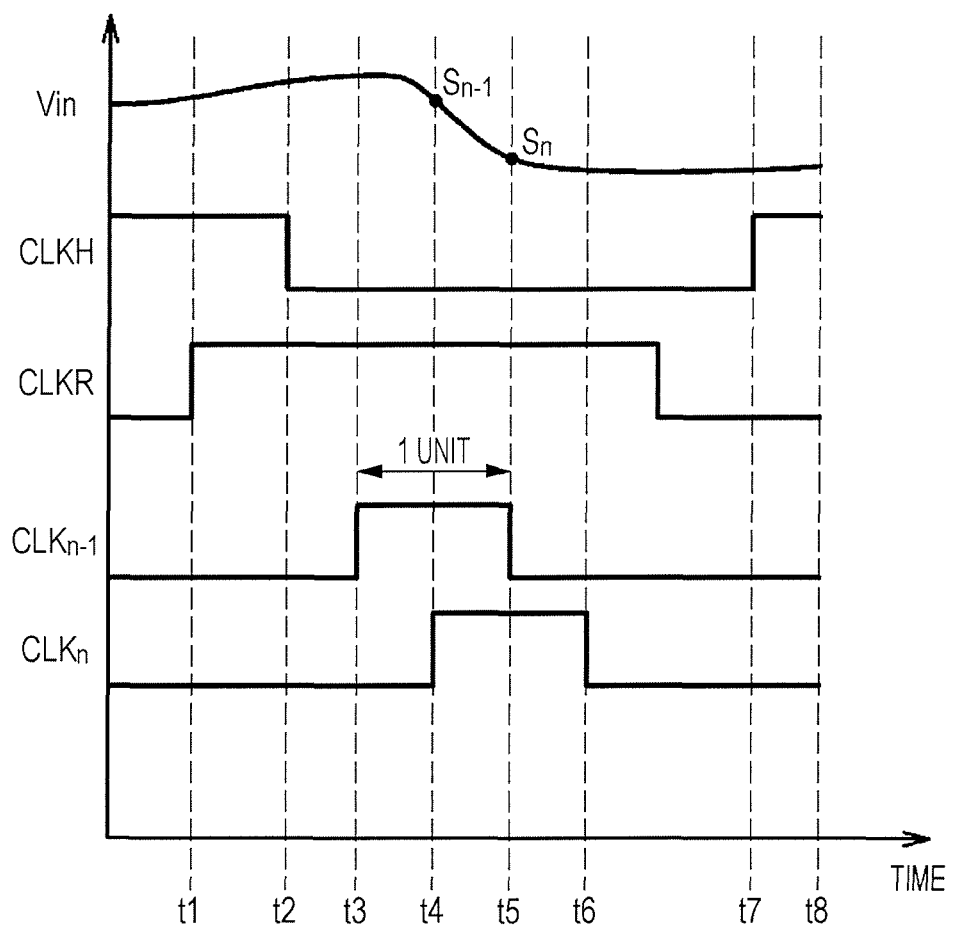
FIG. 4 is a timing chart illustrating an operation of each switch.
Figure 5:
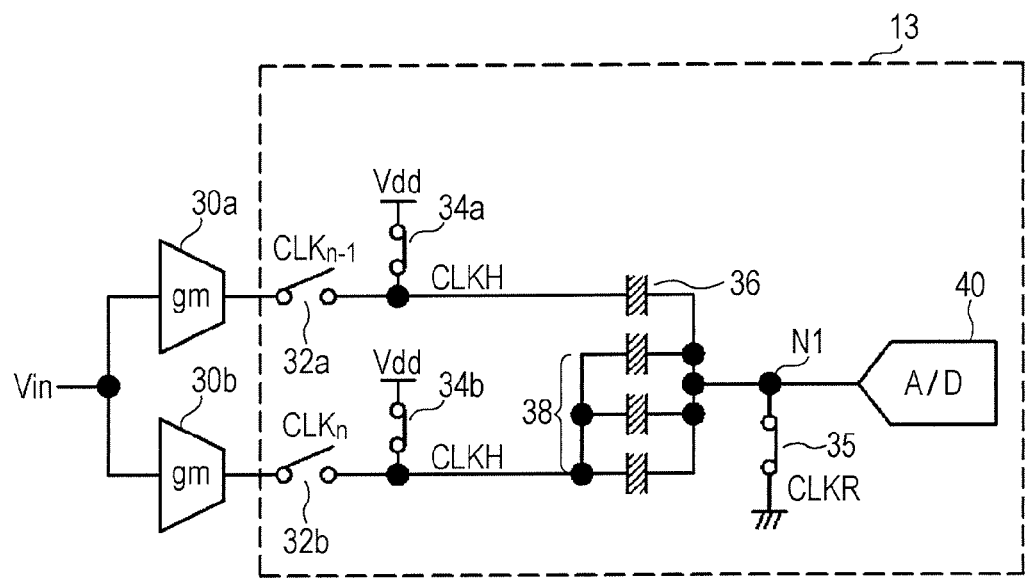
FIG. 5 is a (first) circuit diagram illustrating an operation performed by part of the interpolation circuit.

FIG. 4 is a timing chart illustrating an operation of each switch. FIGS. 5 to 8 are each a circuit diagram illustrating an operation performed by part of the interpolation circuit. Hatched portions in the variable capacitors 36 and 38 illustrated in FIGS. 5 to 8 represent the amounts of electric charge accumulated in the variable capacitors 36 and 38. The area of each hatched portion corresponds to the amount of accumulated electric charge. Referring to FIGS. 4 and 5, in the period between a time t1 and a time t2, CLKH, CLKR, $CLK_{n-1}$, and $CLK_n$ are respectively at high, high, low, and low levels. In this period, each of the variable capacitors 36 and 38 may be electrically connected in series between the power supply Vdd and the ground. Because of this, the variable capacitors 36 and 38 may be charged.

Figure 6:
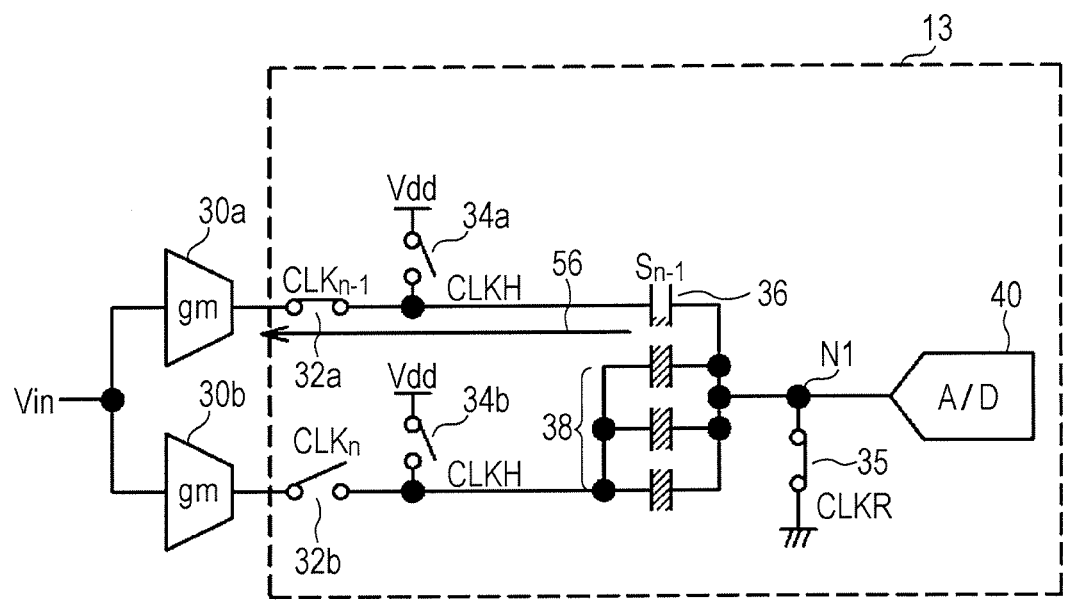
FIG. 6 is a (second) circuit diagram illustrating an operation performed by part of the interpolation circuit.

Referring to FIGS. 4 and 6, in the period between a time t3 and a time t5, CLKH, CLKR, and $CLK_{n-1}$ are respectively at low, high, and high levels. In this period, the variable capacitor 36 may be electrically connected in series between the gm circuit 30$a$ and the ground. Because of this, as indicated by an arrow 56, electric charge may be drawn from the variable capacitor 36. Thus, electric charge corresponding to the voltage signal Vin (corresponding to the input data $S_{n-1}$) during the period between the time t3 and the time t5 may be accumulated in the variable capacitor 36.

Figure 7:
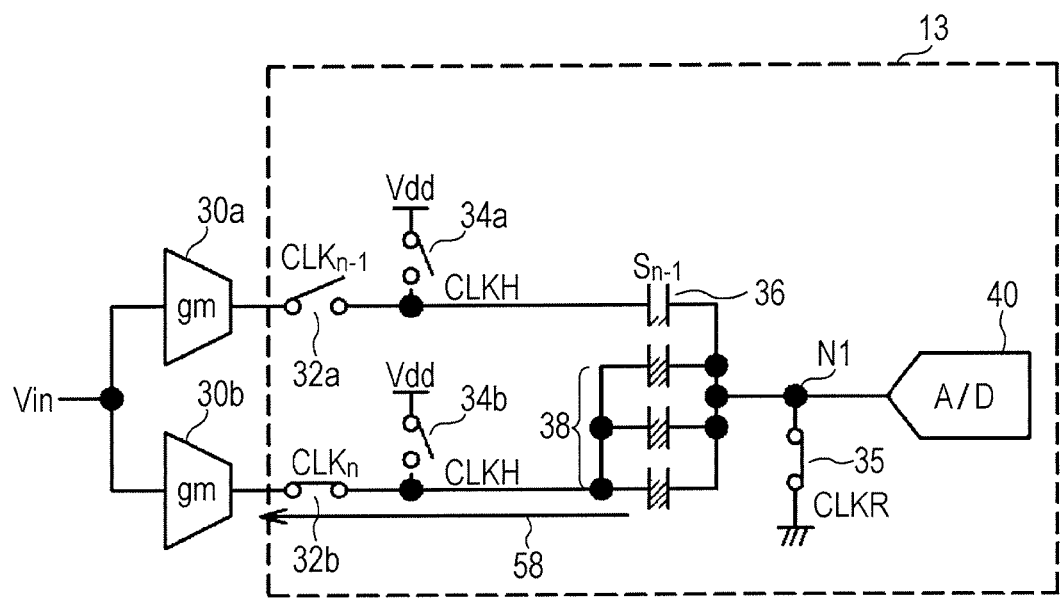
FIG. 7 is a (third) circuit diagram illustrating an operation performed by part of the interpolation circuit.

Referring to FIGS. 4 and 7, in the period between a time t4 and a time t6, CLKH, CLKR, and $CLK_n$ are respectively at low, high, and high levels. In this period, the variable capacitor 38 may be electrically connected in series between the gm circuit 30$b$ and the ground. Because of this, as indicated by an arrow 58, electric charge may be drawn from the variable capacitor 38. Thus, electric charge corresponding to the voltage signal Vin (corresponding to the input data $S_n$) during the period between the time t4 and the time t6 may be accumulated in the variable capacitor 38.

Figure 8:
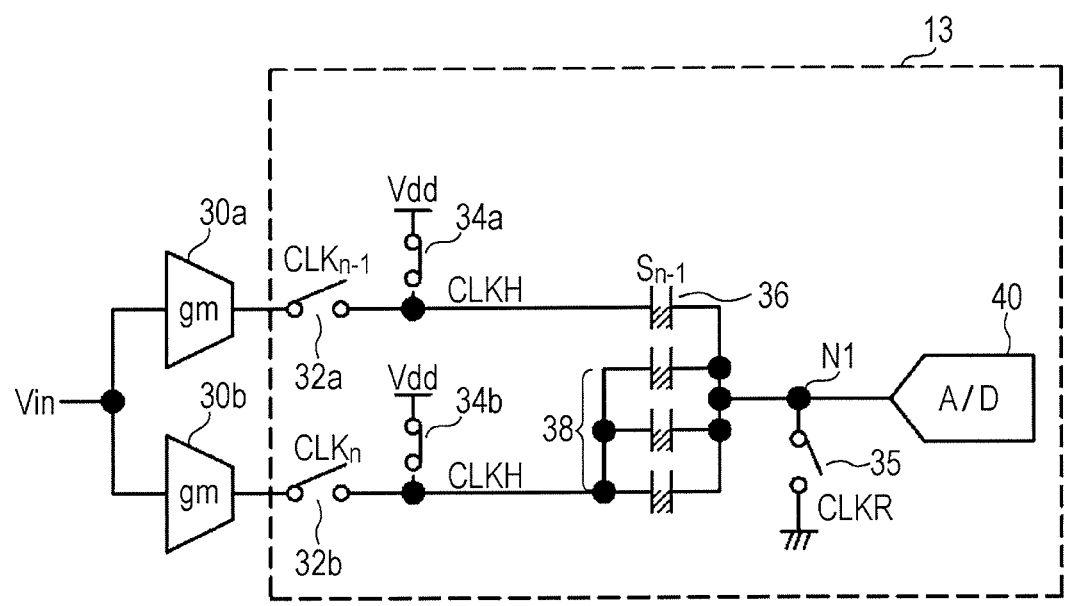
FIG. 8 is a (fourth) circuit diagram illustrating an operation performed by part of the interpolation circuit.

Referring to FIGS. 4 and 8, in the period between a time t7 and a time t8, CLKH, CLKR, $CLK_{n-1}$, and $CLK_n$ are respectively at high, low, low, and low levels. In this period, the variable capacitors 36 and 38 may be electrically connected in parallel between the power supply Vdd and the node N1. The node N1 may be disconnected from the ground. Because of this, electric charges accumulated in the variable capacitors 36 and 38 may be combined. Thus, the voltage of the node N1 is a value corresponding to the interpolation data $D_n$. The A/D 40 may convert the voltage of the node N1 into a digital value and outputs the value.

As described above, the interpolation data $D_n$ may be generated from the pieces of input data $S_{n-1}$ and $S_n$.

Next, a stress test will be described. The stress test is a test for checking, for example, an operational margin of a receiving circuit in the case where the size of an eye pattern of input data becomes smaller than that of an eye pattern in a normal operation. The detection circuit 16 may detect a phase by using a boundary point of output data. Because of this, shifts of phases of a data point and the boundary point of the output data may change an interpolation coefficient, and the interpolation circuit 12 may not operate normally. Thus, the stress test may not be able to be performed.

Figure 9:
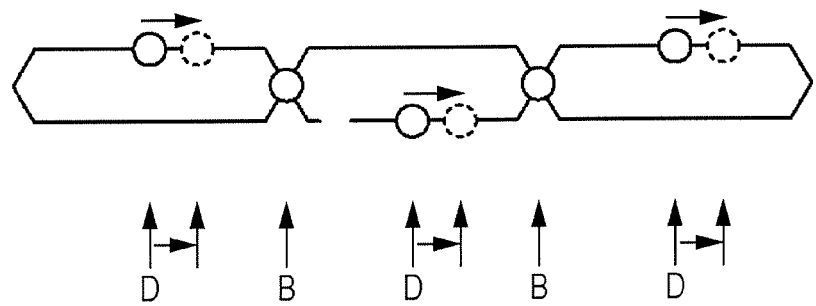
FIG. 9 illustrates interpolation data for performing a stress test.

FIG. 9 illustrates interpolation data for performing a stress test. Referring to FIG. 9, pieces of data serving as boundary points B's may be kept unchanged, and pieces of data serving as data points D's may be shifted from a solid-line circle to a dotted-line circle. Because of this, the detection circuit 16 may not recognize that a phase of output data has been shifted. On the other hand, the data points D's may be shifted. For this reason, the data points D's may be in a state equivalent to a state where the size of an eye pattern becomes reduced. Thus, in a circuit subsequent to the interpolation circuit 12, an operational margin in the case where the size of an eye pattern becomes reduced (the case of a stressed eye) may be tested. For example, in the decision circuit 14, a stress test as to whether or not interpolation data whose eye pattern size is reduced is able to be converted into output data normally may be performed. Thus, for the sake of the stress test, as indicated by vertical arrows, the boundary points B's and the data points D's may be controlled independently.

Figure 10:
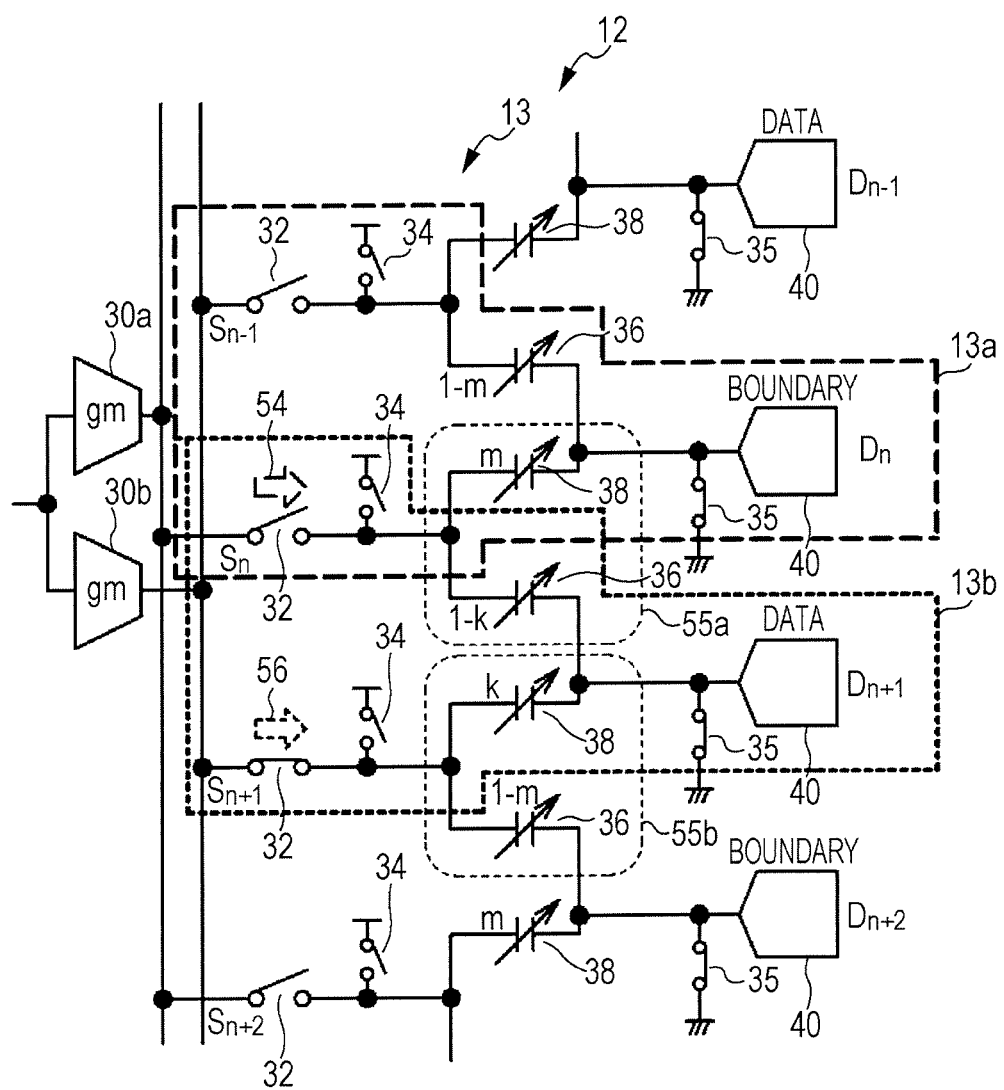
FIG. 10 is a circuit diagram of an interpolation circuit that generates multiple pieces of output data.

FIG. 10 is a circuit diagram of an interpolation circuit that generates multiple pieces of output data. Referring to FIG. 10, the interpolation circuit 12 may include the gm circuits 30a and 30b, and multiple sampling circuits 13a and 13b. The sampling circuits 13a and 13b that are adjacent to each other may share a switch 32. The sampling circuits 13a and 13b that are adjacent to each other may generate pieces of interpolation data that are adjacent to each other in chronological order. For example, the sampling circuit 13a may generate a piece of interpolation data $D_n$ (boundary point) from pieces of input data $S_{n-1}$ and $S_n$. The sampling circuit 13b may generate a piece of interpolation data $D_{n+1}$ (data point) from pieces of input data $S_n$ and $S_{n+1}$. Thus, one sampling circuit 13a of the sampling circuits that are adjacent to each other may generate the boundary point, and the other sampling circuit 13b may generate the data point.

Here, as described by using FIG. 9, the case where phases of a data point and a boundary point are controlled independently will be discussed. Different interpolation coefficients m and k may be assigned to the sampling circuits 13a and 13b. Because of this, the variable capacitor 36 of the sampling circuit 13a may have a capacitance corresponding to 1−m, and the variable capacitor 38 may have a capacitance corresponding to m. Thus, the interpolation data $D_n$ serving as a boundary point may be defined by $D_n=(1-m)\times S_{n-1}+m\times S_n$. Similarly, the interpolation data $D_{n+1}$ serving as a data point output by the sampling circuit 13b may be defined by $D_{n+1}=(1-k)\times S_n+k\times S_{n+1}$. Since m and k are different, it is considered that the phases of the data point and the boundary point may be controlled independently.

However, capacitances of capacitors from which a current (arrow 54) corresponding to the input data $S_n$ draws electric charge correspond to m and 1−k as indicated by a dotted line 55a. On the other hand, capacitances of capacitors from which a current (arrow 56) corresponding to the input data $S_{n+1}$ draws electric charge correspond to k and 1−m as indicated by a dotted line 55b. Since m and k are different, the dotted lines 55a and 55b may be different in terms of capacitance. Thus, in the sampling circuits 13a and 13b, interpolation data having a correct amplitude may not be able to be obtained. Designing an interpolation circuit so as to control a data point and a boundary point independently and to obtain a correct amplitude may make the interpolation circuit more complicated.

The example of the circuit illustrated in FIG. 10 has been described; however, it may be difficult to control phases of a data point and a boundary point independently. As a result, in a simple interpolation circuit, it may be difficult to perform a stress test.

Figure 11:
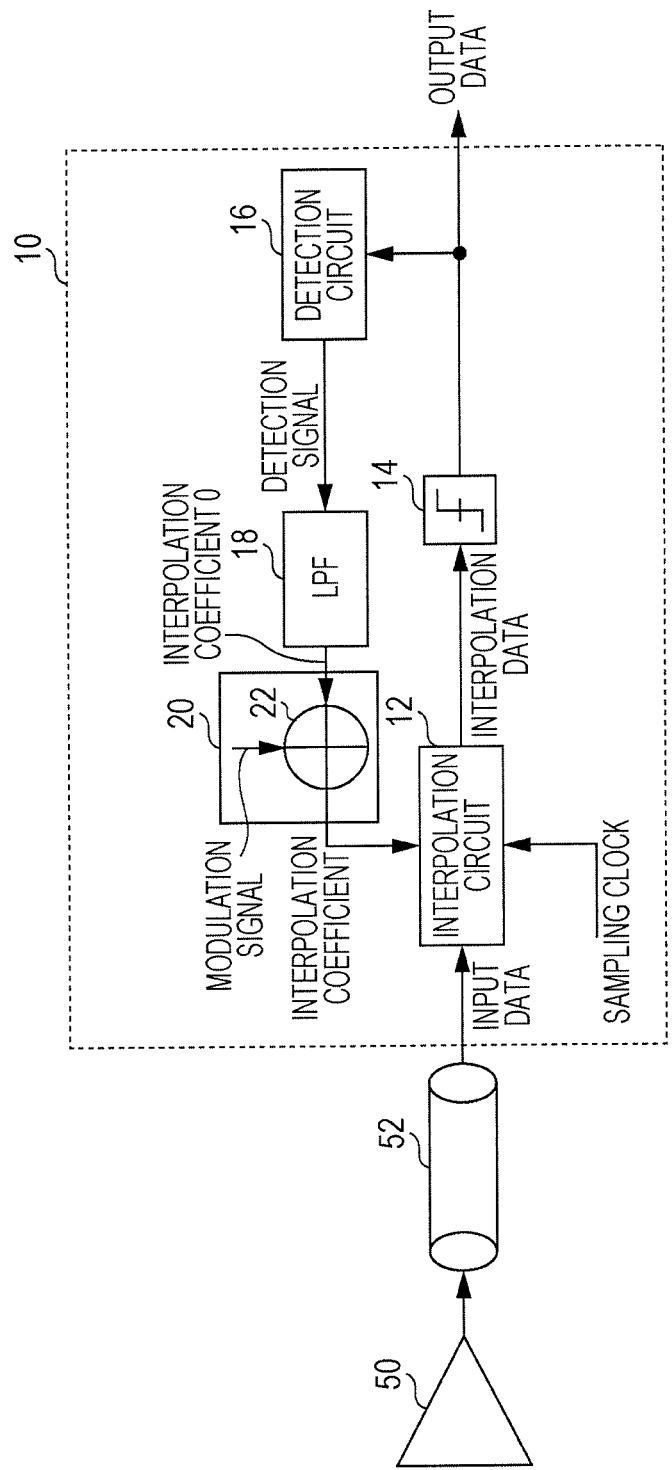
FIG. 11 is a block diagram of a receiving circuit according to a first embodiment.

FIG. 11 is a block diagram of a receiving circuit according to a first embodiment. Referring to FIG. 11, the first embodiment is an example where an interpolation coefficient is modulated by using a modulation signal having a frequency higher than a cutoff frequency of the LPF 18. A modulation circuit 20 may be provided between the LPF 18 and the interpolation circuit 12. The modulation circuit 20 may modulate an interpolation coefficient 0 by using a modulation signal having a frequency different from the cutoff frequency of the LPF 18. The modulation circuit 20 may include an adder 22. The adder 22 may add the modulation signal to the interpolation coefficient 0 output by the LPF 18 and may set an obtained coefficient as an interpolation coefficient. Except for the above, the configuration is the same as that in FIG. 1, and description thereof is omitted.

Figure 12:
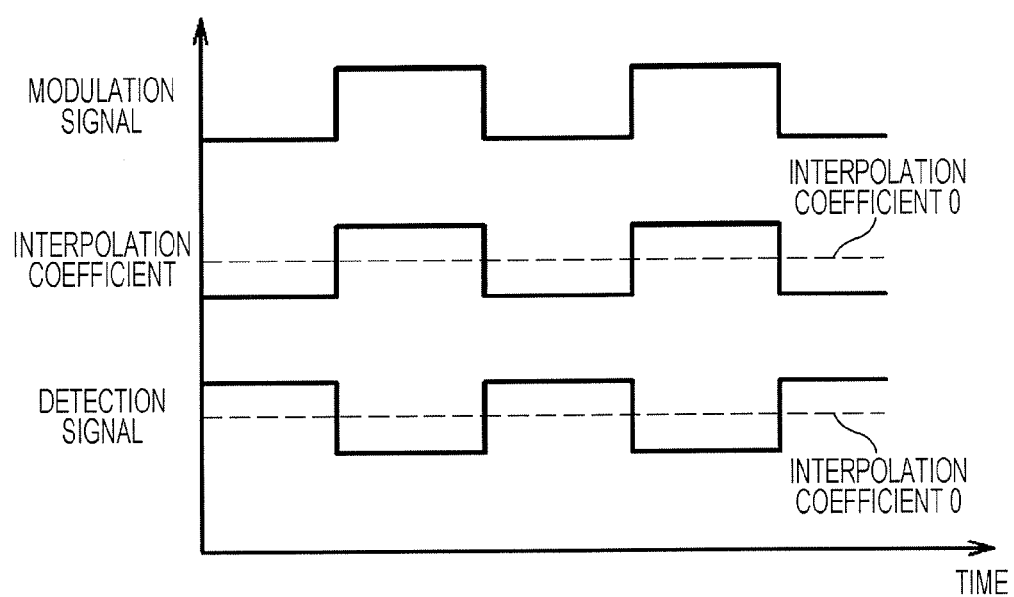
FIG. 12 is a timing chart of a modulation signal, an interpolation coefficient, and a detection signal in the first embodiment.
Figure 13A:
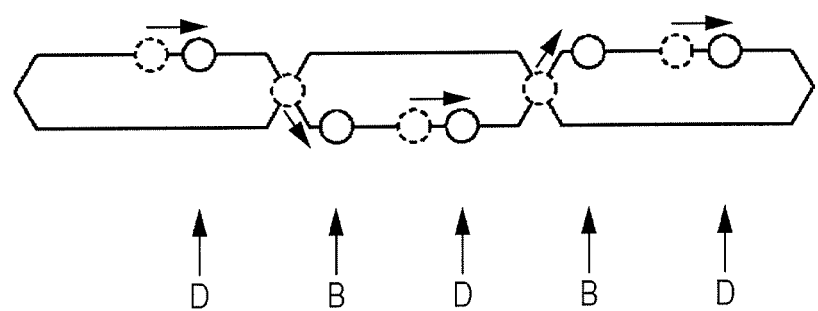
FIGS. 13A and 13B each illustrate interpolation data.
Figure 13B:
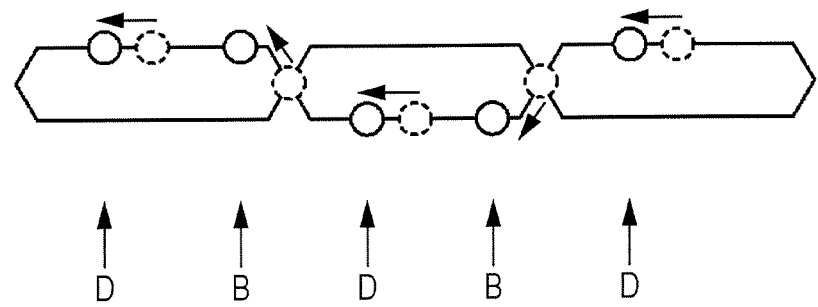

FIG. 12 is a timing chart of a modulation signal, an interpolation coefficient, and a detection signal in the first embodiment. FIGS. 13A and 13B each illustrate interpolation data. Referring to FIG. 12, the modulation signal may have a frequency higher than the cutoff frequency of the LPF 18. For example, the frequency of the modulation signal may be 16 times the cutoff frequency. A modulation frequency is preferably such a frequency that is able to be interrupted by the LPF 18. Because of this, the interpolation coefficient 0 may vary sufficiently slowly with respect to the frequency of the modulation signal. The modulation circuit 20 may apply modulation corresponding to the frequency of the modulation signal to the interpolation coefficient 0. Thus, the interpolation circuit 12 may generate interpolation data so that phases of a data point and a boundary point are modulated.

In FIGS. 13A and 13B, dotted-line circles denote data points and boundary points obtained when an interpolation coefficient is equal to the interpolation coefficient 0. Referring to FIG. 13A, when the interpolation coefficient becomes a positive number higher than the interpolation coefficient 0 by the modulation signal, phases of data points D's and boundary points B's may be delayed as indicated by solid-line circles. Referring to FIG. 13B, when the interpolation coefficient becomes a negative number less than the interpolation coefficient 0 by the modulation signal, phases of data points D's and boundary points B's may be advanced as indicated by the solid-line circles.

The decision circuit 14 may convert the interpolation data into output data with the phase of the data point modulated. Thus, a stress test in the cases where the phase of a data point D is delayed and advanced may be performed.

On the other hand, the detection circuit 16 may generate a detection signal by using a boundary point B of the output data. Because the boundary point B of the output data has been modulated, the detection circuit 16 may generate the detection signal so that a phase of the output data is restored. Because of this, as illustrated in FIG. 12, the detection signal may vary at a frequency substantially the same as that of the modulation signal, and with a phase opposite to that of the modulation signal. Owing to the LPF 18, the interpolation coefficient 0 may vary sufficiently slowly with respect to the frequency of the modulation signal. Thus, the interpolation coefficient 0 is negligibly affected by the modulation signal.

In this way, according to the first embodiment, the frequency of the modulation signal may be set higher than the cutoff frequency of the LPF 18. Thus, in a simple interpolation circuit, a stress test for a circuit subsequent to the decision circuit 14 may be performed. Furthermore, because the LPF 18 interrupts a signal having a frequency the same as that of the modulation signal, the interpolation coefficient 0 is normally generated.

Figure 14:
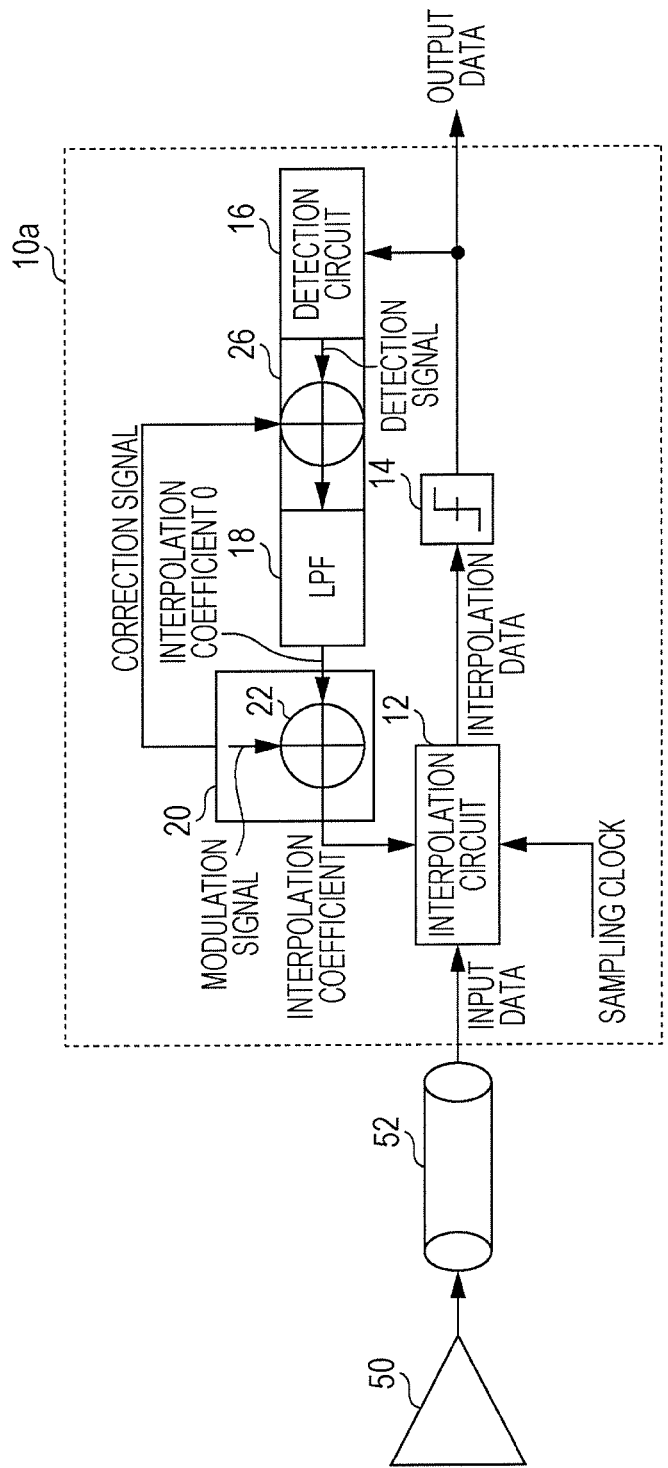
FIG. 14 is a block diagram of a receiving circuit according to a second embodiment.

FIG. 14 is a block diagram of a receiving circuit according to a second embodiment. Referring to FIG. 14, the second embodiment is an example where an interpolation coefficient may be modulated by using a modulation signal having a frequency lower than the cutoff frequency of the LPF 18. A correction circuit 24 may be provided between the detection circuit 16 and the LPF 18. The correction circuit 24 may include an adder 26. The adder 26 may add a detection signal and a correction signal output by the modulation circuit 20 and output an obtained signal to the LPF 18. Except for the above, the configuration is the same as that in FIG. 11 in the first embodiment, and description thereof is omitted.

Figure 15:
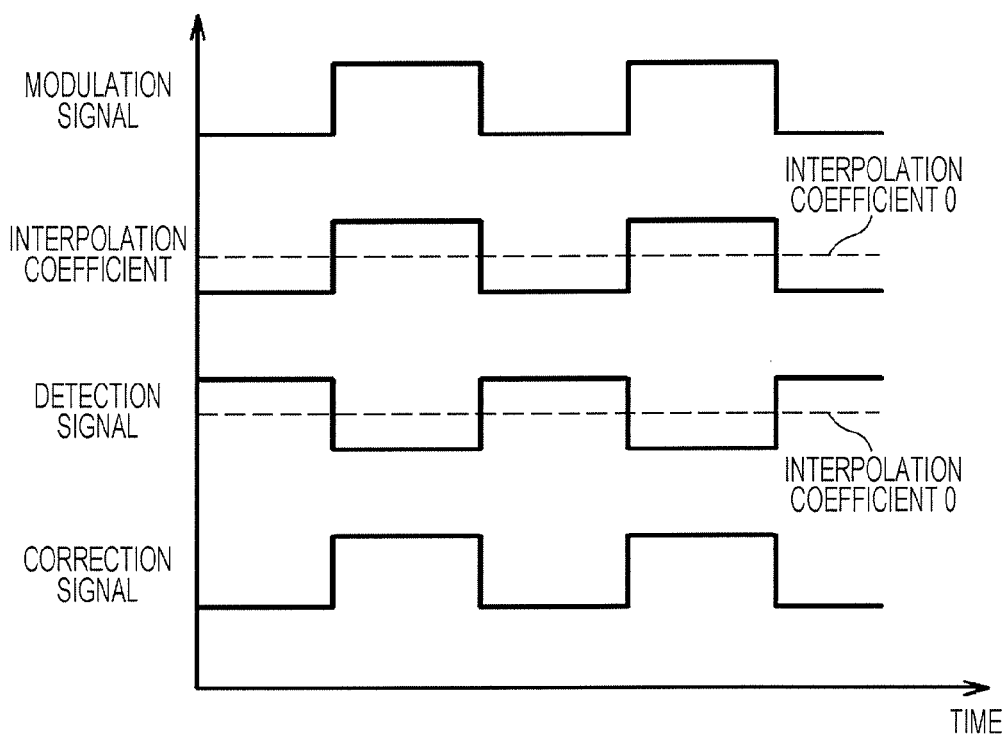
FIG. 15 is a timing chart of a modulation signal, an interpolation coefficient, a detection signal, and a correction signal in the second embodiment.

FIG. 15 is a timing chart of a modulation signal, an interpolation coefficient, a detection signal, and a correction signal in the second embodiment. Referring to FIG. 15, the interpolation coefficient may be modulated by the modulation signal. The modulation signal may have a frequency lower than the cutoff frequency of the LPF 18. For example, a modulation frequency is preferably such a frequency that passes through the LPF 18. An interpolation coefficient 0 may vary rapidly with respect to the frequency of the modulation signal. The modulation circuit 20 may apply modulation corresponding to the frequency of the modulation signal to the interpolation coefficient 0. Thus, the interpolation circuit 12 may generate interpolation data so that phases of a data point and a boundary point are modulated. Hence, as described by using FIGS. 13A and 13B in the first embodiment, a stress test may be performed.

Referring to FIG. 15, the detection signal may vary at a frequency substantially the same as that of the modulation signal, and with a phase opposite to that of the modulation signal. Even if the detection signal is input to the LPF 18 without being processed, variations due to the modulation signal remain in the interpolation coefficient 0 because the modulation frequency is lower than the cutoff frequency of the LPF 18.

The modulation circuit 20 may output a correction signal synchronized with the modulation signal. The correction signal may have a phase opposite to that of the detection signal and an amplitude substantially the same as the modulation width of the detection signal. A detection signal obtained by removing a modulation portion of the detection signal may be generated by the adder 26. Thus, the interpolation coefficient 0 may vary sufficiently slowly with respect to the frequency of the modulation signal.

According to the second embodiment, the frequency of the modulation signal is set lower than the cutoff frequency of the LPF 18. The correction circuit 24 may correct the detection signal by using the correction signal synchronized with the modulation signal. Thus, in a simple correction circuit, a stress test may be performed.

As in the first and second embodiments, the modulation circuit 20 may modulate an interpolation coefficient 0 generated by the LPF 18 by using a modulation signal having a frequency different from the cutoff frequency of the LPF 18, and output a modulated coefficient to the interpolation circuit 12 as an interpolation coefficient. For example, when a stress test is performed, the modulation circuit 20 may modulate the interpolation coefficient 0. When a stress test is not performed, the modulation circuit 20 does not modulate the interpolation coefficient 0.

As in FIG. 10, when the interpolation circuit 12 generates interpolation data $D_n$ from pieces of input data $S_{n-1}$ and $S_n$ that are adjacent to each other in chronological order, a data point and a boundary point may not be able to be controlled independently. Thus, as in the first and second embodiments, the modulation circuit 20 is preferably used.

In addition, the interpolation circuit 12 may apply currents corresponding to pieces of input data to the variable capacitor 36 (first variable capacitor) and the variable capacitor 38 (second variable capacitor) that are capable of changing capacitances in accordance with an interpolation coefficient. A point in time at which a current is applied to the variable capacitor 36 is earlier than that at which a current is applied to the variable capacitor 38. Subsequently, pieces of interpolation data serving as respectively a data point and a boundary point may be generated by combining electric charges of the variable capacitors 36 and 38. As described by using FIG. 10, such an interpolation circuit 12 may not be able to control the data point and the boundary point independently. Thus, as in the first and second embodiments, the modulation circuit 20 is preferably used.

Figure 16:
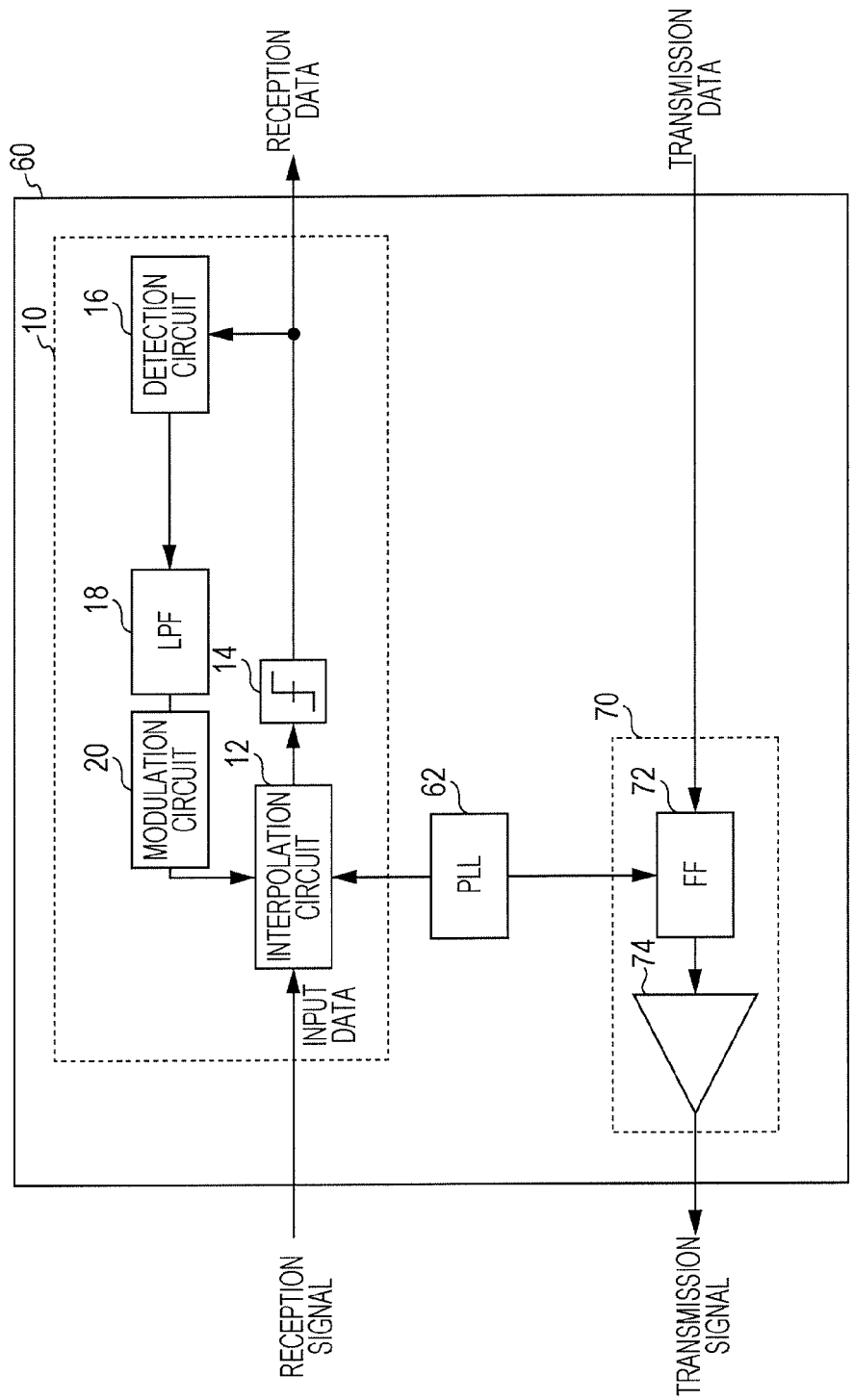
FIG. 16 is a block diagram of a communication circuit according to a third embodiment.

A third embodiment is an example of a semiconductor chip in which a communication circuit including the receiving circuit according to the first or second embodiment is formed. FIG. 16 is a block diagram of a communication circuit according to the third embodiment. Referring to FIG. 16, the communication circuit including a receiving circuit 10 and a transmitting circuit 70 may be formed in a semiconductor chip 60. The receiving circuit 10 may output, as reception data, which is a digital signal, a reception signal output by a light-to-electricity converter. The receiving circuit 10 is the receiving circuit according to the first or second embodiment, and description thereof is omitted. The transmitting circuit 70 may convert transmission data, which is a digital signal, into a transmission signal and output the transmission signal to an electricity-to-light converter. The transmitting circuit 70 may include a flip-flop (FF) 72 and an amplifier 74. A phase-locked loop (PLL) 62 may generate a sampling clock and output the sampling clock to the interpolation circuit 12 and the FF 72.

As in the third embodiment, a communication circuit including the receiving circuit according to the first or second embodiment and a transmitting circuit may be formed in a semiconductor chip.

Figure 17:
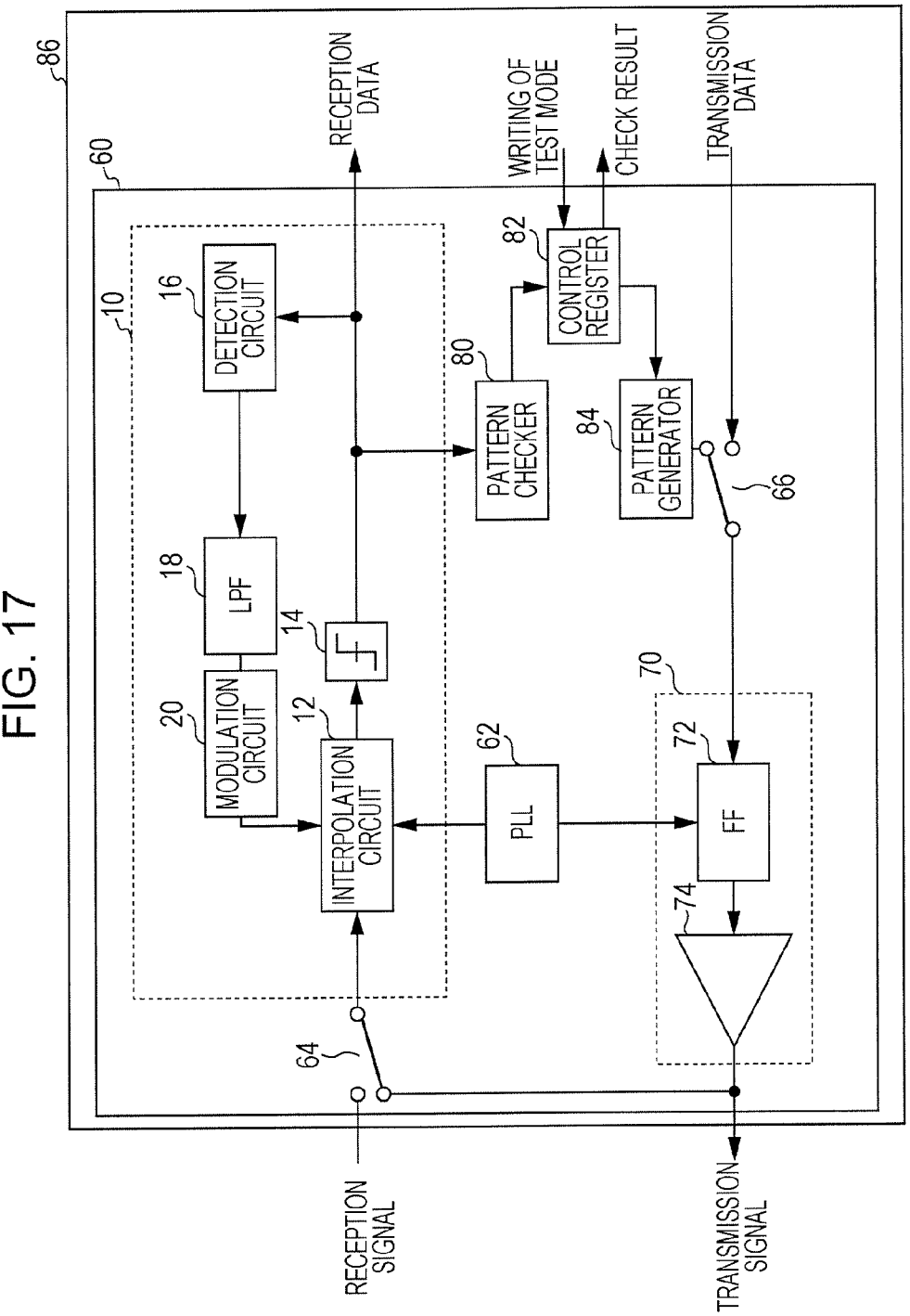
FIG. 17 is a block diagram of a system in which a stress test is performed according to a fourth embodiment.

A fourth embodiment is an example where a stress test for a receiving circuit is performed. For example, the example is a shipping test or a field test of the semiconductor chip 60. FIG. 17 is a block diagram of a system in which a stress test is performed according to the fourth embodiment. Referring to FIG. 17, the semiconductor chip 60 may include selection circuits 64 and 66, a pattern checker 80, a control register 82, and a pattern generator 84 in addition to the components in the third embodiment. The selection circuit 64 may be a circuit that selects that an external reception signal be connected to the receiving circuit 10, or that an output of the transmitting circuit 70 be connected to the receiving circuit 10. The selection circuit 66 is a circuit that may select that external transmission data be connected to the transmitting circuit 70, or that an output of the pattern generator 84 be connected to the transmitting circuit 70. When the semiconductor chip 60 is in a normal state (for example, when the semiconductor chip 60 transmits a transmission signal and receives a reception signal), the selection circuit 64 may output a reception signal to the receiving circuit 10. The selection circuit 66 may output transmission data to the transmitting circuit 70.

When a stress test for the receiving circuit 10 is performed, the semiconductor chip 60 may be placed in a test board 86. A test mode may be written from the test board 86 into the control register 82. The pattern generator 84 may generate a test pattern for the stress test by using the test mode stored in the control register 82. The selection circuit 66 may output an output signal of the pattern generator 84 to the transmitting circuit 70. The transmitting circuit 70 may output a signal for the stress test. The modulation circuit 20 may modulate an interpolation coefficient. The selection circuit 64 may output the output signal of the transmitting circuit 70 to the receiving circuit 10. The pattern checker 80 may check reception data (output data) output by the receiving circuit 10 and may output a check result to the control register 82. For example, when the output signal of the pattern generator 84 matches the reception data, it is determined that the stress test has been passed. When the output signal does not match the reception data, it is determined that the stress test has been failed. The test board 86 may read the check result from the control register 82. Thus, the stress test for the semiconductor chip 60 may be performed.

According to the fourth embodiment, the selection circuit 64 (first selection circuit) may select and output, as input data, either a transmission signal or an external reception signal to the receiving circuit 10. The selection circuit 66 (second selection circuit) may select and output either external transmission data or a pattern for the stress test to the transmitting circuit 70. Thus, the stress test for the receiving circuit 10 may be performed.

A test pattern may be output to the semiconductor chip 60 by the test board 86, reception data may be obtained from the semiconductor chip 60, and it may be determined whether the stress test has been passed or failed. However, in this case, it is difficult for the test board 86 to access the semiconductor chip 60 at a high speed. Hence, as in the first embodiment, a modulation method using a high frequency is not preferable, and, as in the second embodiment, a modulation method using a low frequency is preferable.

According to the fourth embodiment, in the semiconductor chip 60, the pattern generator 84 may generate a test pattern, and the pattern checker 80 may check reception data. Because of this, both the modulation methods according to the first and second embodiments may be used.

Furthermore, the pattern generator 84 and the pattern checker 80 of the semiconductor chip 60 may perform a self test without using the test board 86.

Although the embodiments of the present disclosure have been described in detail above, the present disclosure is not limited to the specific embodiments, and various modifications and changes may be made within the scope of the gist of the present disclosure described in claims.

All examples and conditional language recited herein are intended for pedagogical purposes to aid the reader in understanding as parts of the invention and the concepts contributed by the inventor(s) to furthering the art, and are to be construed as being without limitation to such specifically recited examples and conditions, nor does the organization of such examples in the specification relate to a showing of the superiority and/or inferiority of various aspects of the invention. Although example embodiments of the present invention have been described in detail, it should be understood that the various changes, substitutions, and alterations could be made hereto without departing from the spirit and scope hereof.

What is claimed is:

1. A receiving circuit, comprising:
   an interpolation circuit configured to generate, by using an interpolation coefficient, output data including a data point and a boundary point from pieces of input data that are input in chronological order;
   a detection circuit configured to output a detection signal when the detection circuit detects a phase of the output data by using the boundary point of the output data;
   a low pass filter configured to filter the detection signal and generate the interpolation coefficient; and
   a modulation circuit configured to modulate, by using a modulation signal having a frequency different from a cutoff frequency of the low pass filter, the interpolation coefficient generated by the low pass filter, and output the modulated interpolation coefficient to the interpolation circuit;
   wherein the interpolation circuit is further configured to apply currents corresponding to the pieces of input data to a first variable capacitor and a second variable capacitor that are capable of changing capacitances in accordance with the interpolation coefficient, a point in time at which a current is applied to the first variable capacitor is earlier than a point in time at which a current is applied to the second variable capacitor, and the interpolation circuit is further configured to generate the data point and the boundary point by combining electric charges of the first variable capacitor and the second variable capacitor.

2. The receiving circuit according to claim 1, wherein, when an operational margin of the receiving circuit in the case where a size of an eye pattern of the pieces of input data becomes reduced is tested, the modulation circuit is further configured to modulate the interpolation coefficient.

3. The receiving circuit according to claim 1, wherein the frequency of the modulation signal is higher than the cutoff frequency.

4. The receiving circuit according to claim 1, further comprising:
   a correction circuit configured to correct the detection signal by using a correction signal synchronized with the modulation signal whose frequency is lower than the cutoff frequency.

5. The receiving circuit according to claim 1, further comprising:
   a decision circuit configured to determine whether an output of the interpolation circuit is at a high level or a low level, and generate output data.

6. The receiving circuit according to claim 1, wherein the interpolation circuit is further configured to generate interpolation data from pieces of input data that are adjacent to each other in chronological order.

7. A communication circuit, comprising:
   a transmitting circuit configured to output pieces of data;
   an interpolation circuit configured to generate, by using an interpolation coefficient, output data that includes a data point and a boundary point from the pieces of data that are input in chronological order;
   a detection circuit configured to output a detection signal when the detection circuit detects a phase of the output data by using the boundary point of the output data;
   a low pass filter configured to filter the detection signal and generate the interpolation coefficient;
   a modulation circuit configured to modulate, by using a modulation signal having a frequency different from a cutoff frequency of the low pass filter, the interpolation coefficient generated by the low pass filter, and output the modulated interpolation coefficient to the interpolation circuit;
   a first selection circuit configured to select and output, as any one of the pieces of data, either a transmission signal or an external reception signal to a receiving circuit; and
   a second selection circuit configured to select and output, to the transmitting circuit, either external transmission data or a pattern for testing an operational margin of the receiving circuit in the case where a size of an eye pattern of the pieces of data becomes reduced.

\* \* \* \* \*